US012609483B2

(12) United States Patent
Hsu et al.

(10) Patent No.: US 12,609,483 B2
(45) Date of Patent: Apr. 21, 2026

(54) CONNECTOR MODULE

(71) Applicant: PEGATRON CORPORATION, Taipei City (TW)

(72) Inventors: Hsiang-Chi Hsu, Taipei City (TW); Ching-Yen Huang, Taipei City (TW); Yi-Chun Tang, Taipei (TW); Hui-Chen Wang, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 464 days.

(21) Appl. No.: 18/306,823

(22) Filed: Apr. 25, 2023

(65) Prior Publication Data

US 2024/0006803 A1 Jan. 4, 2024

(30) Foreign Application Priority Data

Jul. 4, 2022 (CN) ......................... 202210779818.2

(51) Int. Cl.

| | |
|---|---|
| ***H01R 13/52*** | (2006.01) |
| ***H01R 13/516*** | (2006.01) |
| ***H01R 13/6582*** | (2011.01) |
| ***H01R 24/60*** | (2011.01) |

(52) U.S. Cl.

CPC ....... *H01R 13/5219* (2013.01); *H01R 13/516* (2013.01); *H01R 13/6582* (2013.01); *H01R 24/60* (2013.01)

(58) Field of Classification Search

CPC .............. H01R 13/5219; H01R 13/516; H01R 13/6582; H01R 13/52; H01R 24/60

USPC ........................................................... 439/271

See application file for complete search history.

(56) References Cited

U.S. PATENT DOCUMENTS

| | | | | |
|---|---|---|---|---|
| 6,244,886 B1 * | 6/2001 | Strang | ................ | H01R 13/5202 439/271 |
| 7,922,535 B1 * | 4/2011 | Jiang | .................. | H01R 13/5205 439/271 |
| 8,092,252 B2 * | 1/2012 | Peng | .................. | H01R 13/5202 439/607.25 |
| 9,634,425 B1 * | 4/2017 | Hsu | .................... | H01R 13/5202 |
| 10,177,488 B2 * | 1/2019 | Zhao | ...................... | H01R 24/20 |

(Continued)

FOREIGN PATENT DOCUMENTS

| | | | | |
|---|---|---|---|---|
| CN | 201781111 U * | 3/2011 | ......... | H01R 13/7172 |
| CN | 103972719 A * | 8/2014 | ......... | H01R 13/5219 |

(Continued)

*Primary Examiner* — Abdullah A Riyami
(74) *Attorney, Agent, or Firm* — J.C. PATENTS

(57) ABSTRACT

A connector module is adapted to be disposed in a casing including a casing opening. The connector module includes a connector shell, an elastic rib, a connection terminal, a first and a second conductive layer. The connector shell includes a front side and a first opening. The first opening is aligned with the casing opening. The elastic rib is disposed and protrudes from the front side. The elastic rib surrounds the first opening. The connection terminal is disposed in the connector shell and exposed to the first opening. The first conductive layer is coated on the front side and the elastic rib, and contacts with the casing. The second conductive layer is laid on a side of the first conductive layer opposite to the front side and includes a second opening. The first opening and the elastic rib coated with the first conductive layer are exposed to the second opening.

10 Claims, 4 Drawing Sheets

(56) References Cited

U.S. PATENT DOCUMENTS

| | | | | |
|---|---|---|---|---|
| 10,276,972 | B1 * | 4/2019 | Lai | H01R 13/521 |
| 10,797,429 | B2 * | 10/2020 | Hsu | H01R 13/5202 |
| 2004/0106440 | A1 * | 6/2004 | Haruyama | H04N 23/54<br>455/566 |
| 2011/0294345 | A1 * | 12/2011 | Peng | H01R 13/5202<br>439/589 |
| 2014/0213088 | A1 * | 7/2014 | Furuya | H01R 13/5219<br>439/271 |
| 2015/0207263 | A1 * | 7/2015 | Fabre | H01R 13/6581<br>439/271 |
| 2015/0288108 | A1 * | 10/2015 | Fischer | H01R 13/6584<br>439/271 |
| 2018/0177082 | A1 * | 6/2018 | Wei | H04N 23/54 |
| 2019/0341717 | A1 * | 11/2019 | Hsu | H01R 13/5202 |

FOREIGN PATENT DOCUMENTS

| | | | | | |
|---|---|---|---|---|---|
| CN | 204948203 | U | * | 1/2016 | |
| CN | 205752748 | U | * | 11/2016 | |
| CN | 208706269 | | | 4/2019 | |
| CN | 112654130 | | | 4/2021 | |
| CN | 112654130 | A | * | 4/2021 | H05K 1/02 |
| CN | 112993654 | B | * | 10/2022 | H01R 13/521 |
| JP | 2001068205 | A | * | 3/2001 | H01R 13/5202 |
| TW | M618022 | | | 10/2021 | |

* cited by examiner

CONNECTOR MODULE

CROSS-REFERENCE TO RELATED APPLICATION

This application claims the priority benefit of China application serial no. 202210779818.2, filed on Jul. 4, 2022. The entirety of the above-mentioned patent application is hereby incorporated by reference herein and made a part of this specification.

BACKGROUND

Technical Field

The disclosure relates to a connector module, and more particularly to a connector module with waterproof and electromagnetic protection effects.

Description of Related Art

Generally speaking, electronic devices have an exposed connector for external device connection, and how to provide waterproof and electromagnetic protection at the same time for the connector is a direction of research in this field.

SUMMARY

The disclosure relates to a connector module, which provides waterproof and electromagnetic protection effects.

According to the embodiments of the disclosure, a connector module is adapted to be disposed in a casing. The casing includes a casing opening. The connector module includes a connector shell, an elastic rib, a connection terminal, a first conductive layer, and a second conductive layer. The connector shell includes a front side and a first opening located on the front side. The first opening is adapted to be aligned with the casing opening. The elastic rib is disposed and protrudes from the front side. The elastic rib surrounds the first opening. The connection terminal is disposed in the connector shell and exposed to the first opening. The first conductive layer is coated on the front side and the elastic rib and the first conductive layer is adapted to contact with the casing. The second conductive layer is laid on a side of the first conductive layer opposite to the front side and includes a second opening. The first opening and the elastic rib coated with the first conductive layer are exposed to the second opening.

Based on the above, the elastic rib of the connector module of disclosure protrudes from the front side of the connector shell, and the elastic rib surrounds the first opening of the connector shell. The first conductive layer is at least coated on the elastic rib, and a section of the first conductive layer on the elastic rib is adapted to contact with a section of the casing surrounding the casing opening. The second conductive layer is laid at least on the front side of the connector shell, and the first opening and the elastic rib of the connector shell are exposed to the second opening of the second conductive layer. Through the above configuration, since the elastic rib abuts against a section of the casing surrounding the casing opening, a waterproof effect is provided between the connector module and the casing. In addition, since a section of the first conductive layer on the elastic rib may contact with a section of the casing surrounding the casing opening, and the second conductive layer is laid at least on the front side of the connector shell, the connector module may provide a good electromagnetic protection effect.

DESCRIPTION OF THE EMBODIMENTS

Figure 1:
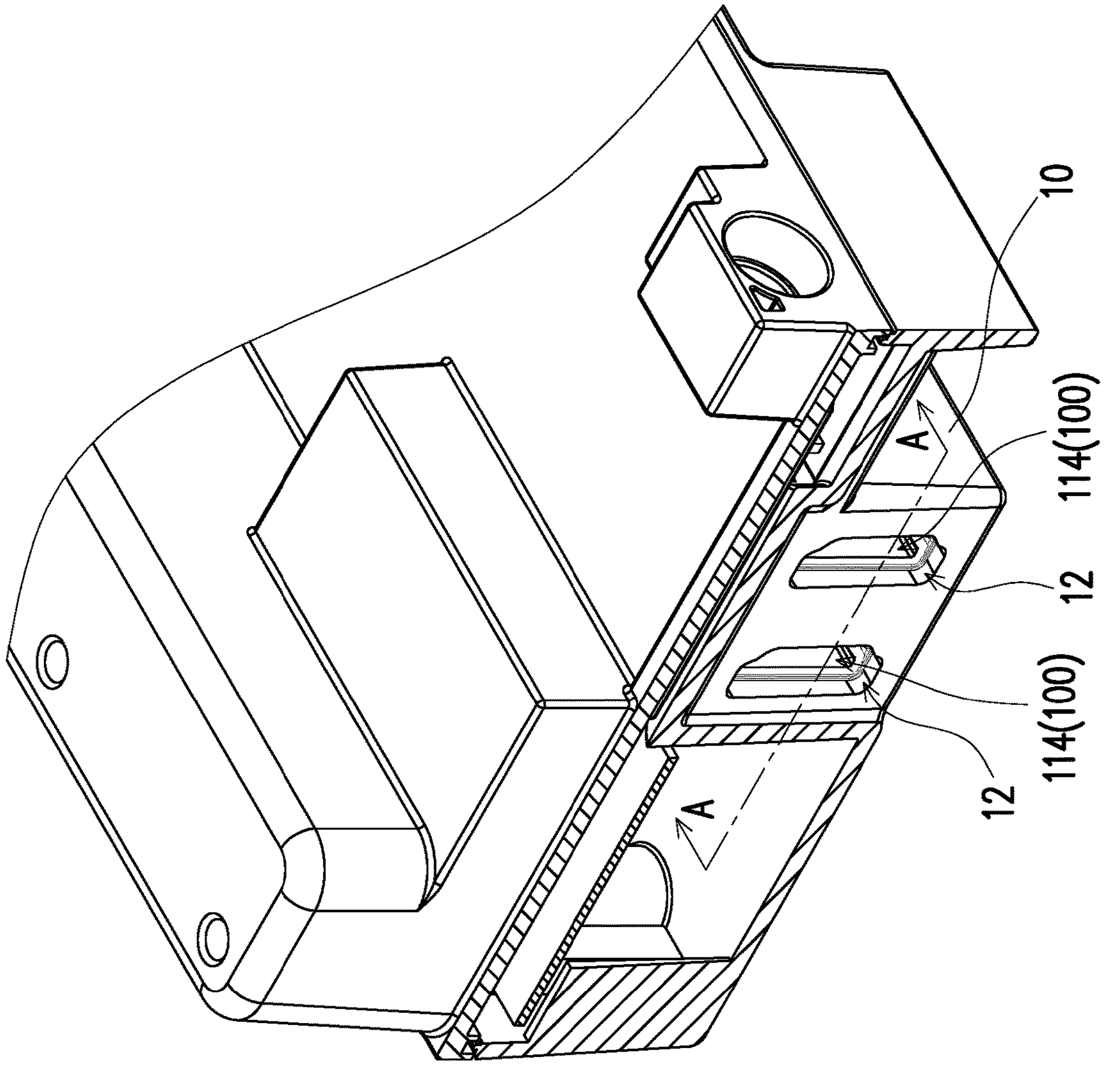
FIG. 1 is a schematic view in which a connector module of an embodiment of the disclosure is disposed in a casing.

Reference will now be made in detail to the exemplary embodiments of the disclosure, and examples of the exemplary embodiments are illustrated in the accompanying drawings. Whenever possible, the same reference numerals are used in the drawings and the description to indicate the same or similar parts.

FIG. 1 is a schematic view in which a connector module of an embodiment of the disclosure is disposed in a casing. Referring to FIG. 1, a connector module 100 of this embodiment is adapted to be disposed in a casing 10. The casing 10 is, for example, a metal casing, which may be used as a system ground. Nevertheless, the casing 10 may also be partially metal and partially non-metal, and the type of the casing 10 is not limited thereto. The casing 10 includes a casing opening 12, and the connector module 100 is disposed and exposed to the casing opening 12 for connection of an external device (not shown).

In this embodiment, the connector module 100 is, for example, an HDMI connector, which transmits high-speed signals and has higher requirements for electromagnetic protection, but the type of the connector module 100 and the type of the signal transmitted are not limited thereto. In other embodiments, the connector module 100 may also be a USB connector.

Figure 2:
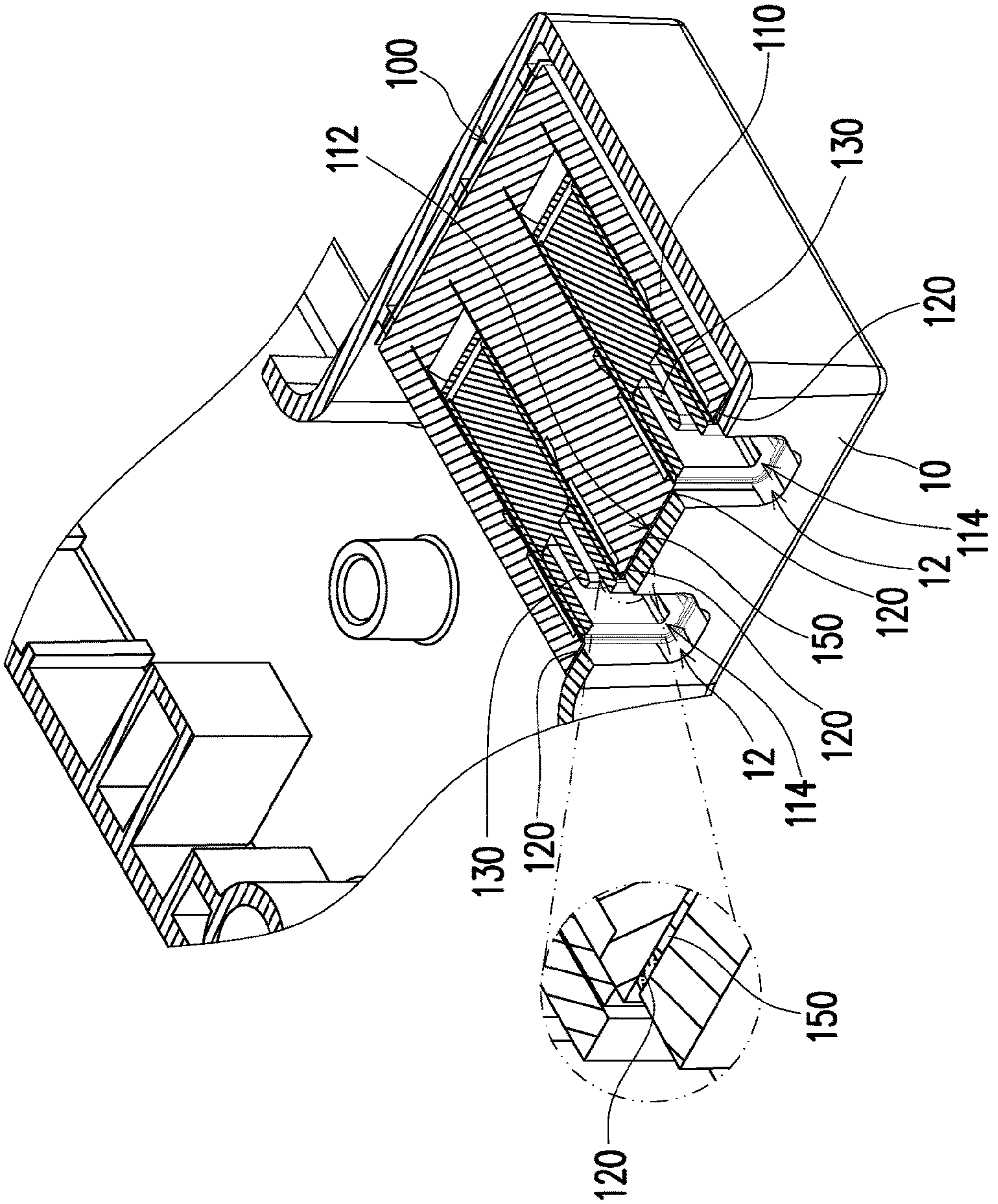
FIG. 2 is a cross-sectional schematic view along the A-A line segment in FIG. 1.
Figure 3:
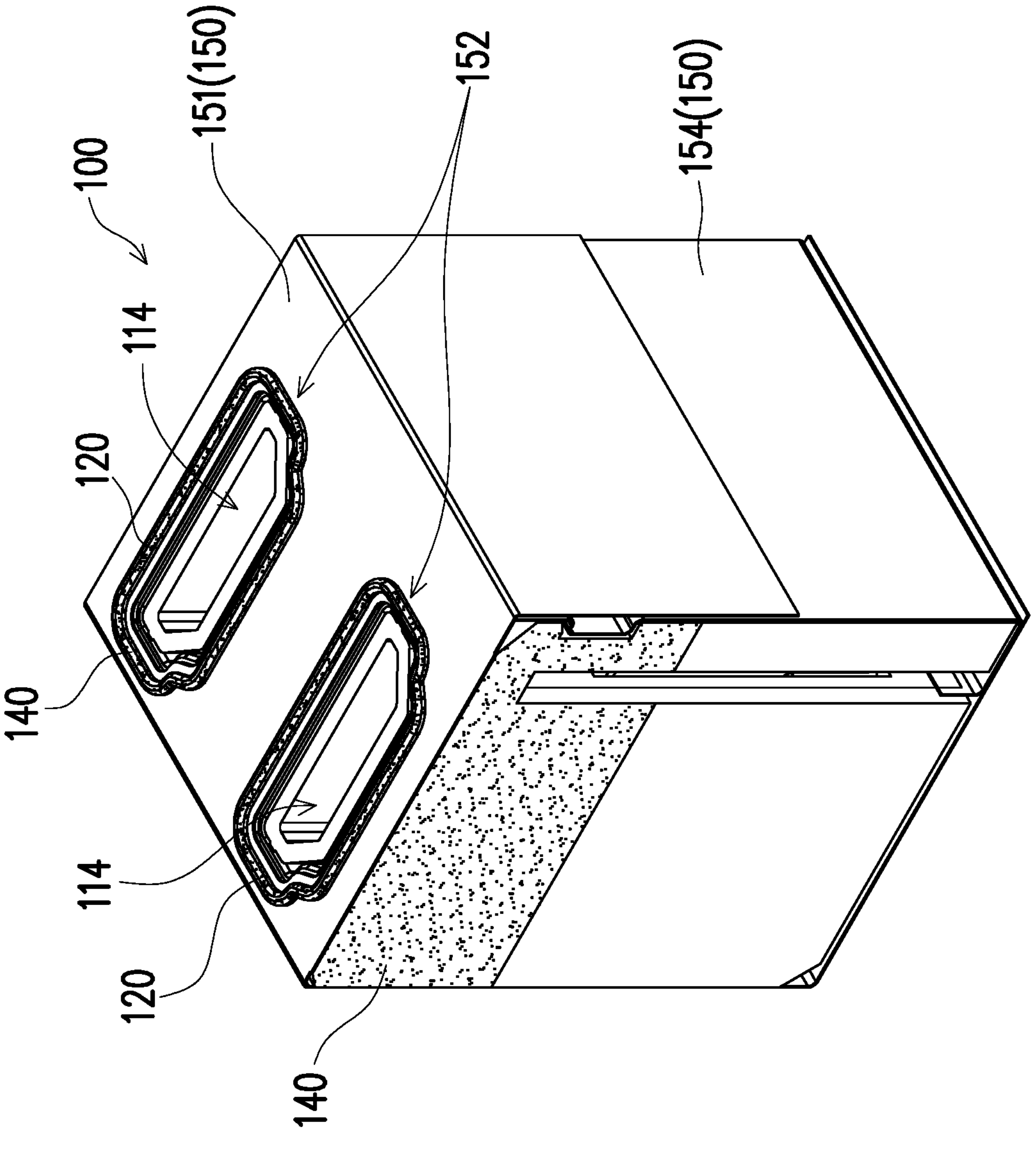
FIG. 3 is a schematic view of the connector module in FIG. 1 from another perspective.
Figure 4:
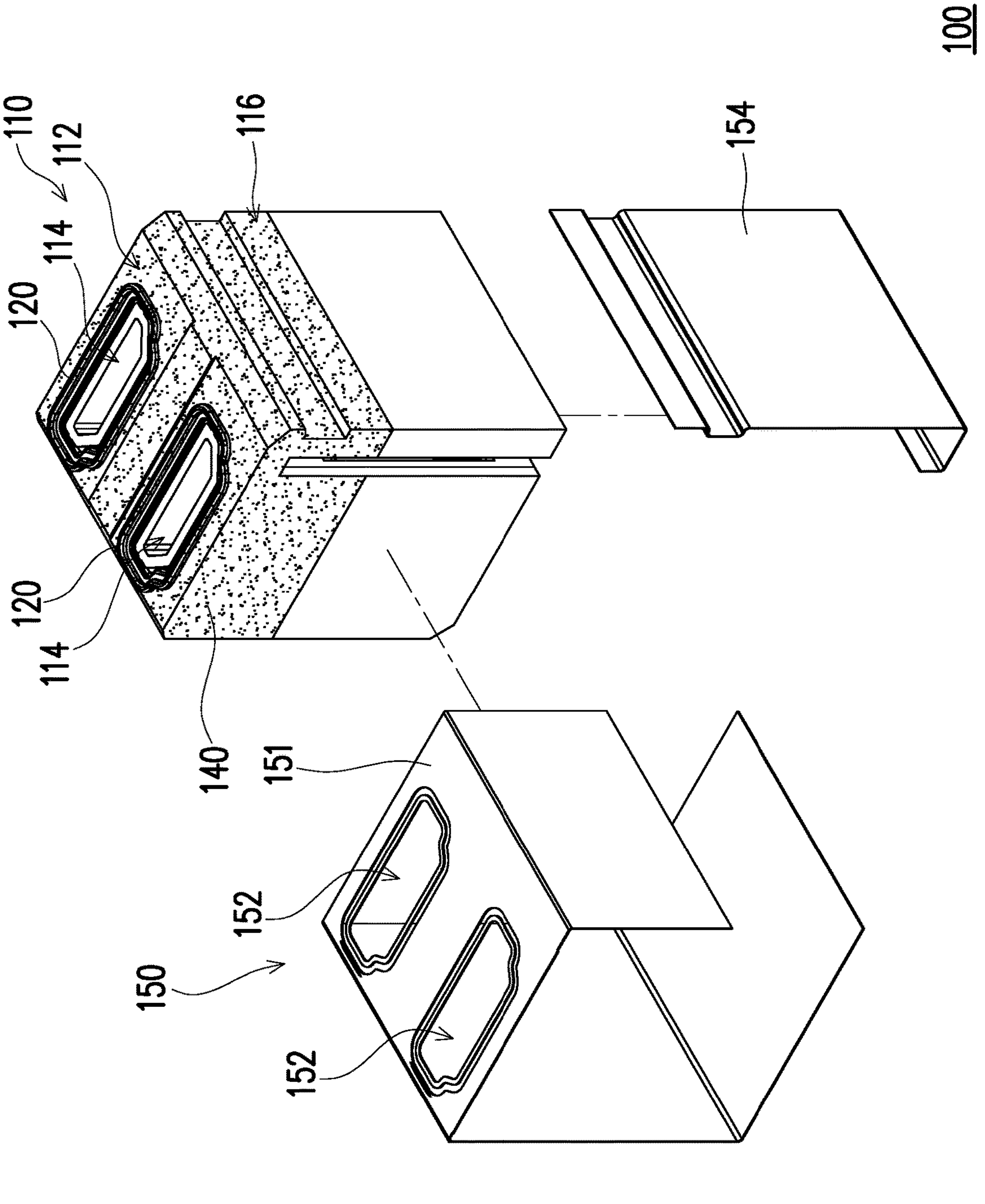
FIG. 4 is an exploded schematic view of FIG. 3.

FIG. 2 is a cross-sectional schematic view along the A-A line segment in FIG. 1. FIG. 3 is a schematic view from another perspective of the connector module in FIG. 1. FIG. 4 is an exploded schematic view of FIG. 3. As shown in FIG. 2 to FIG. 4, the connector module 100 includes a connector shell 110, an elastic rib 120, a connection terminal 130, a first conductive layer 140, and a second conductive layer 150. The connector shell 110 is, for example, a metal shell. The connector shell 110 includes a front side 112 and a first opening 114 located on the front side 112. The connection terminal 130 is disposed in the connector shell 110 and exposed to the first opening 114. The first opening 114 is adapted to be aligned with the casing opening 12 for inserting and connecting of an external device to the connection terminal 130.

As shown in FIG. 4, the elastic rib 120 is disposed and protrudes from the front side 112 of the connector shell 110, and the elastic rib 120 surrounds the first opening 114 of the connector shell 110. In this embodiment, an inner profile of the elastic rib 120 corresponds to a profile of the first opening 114, but is not limited thereto, as long as the elastic rib 120 surrounds the first opening 114. In this embodiment, the material of the elastic rib 120 is rubber or silica gel, which has the features of being elastic, flexible, and waterproof. In addition, in this embodiment, the elastic rib 120 and the connector shell 110 may be integrated by injection molding.

As shown in FIG. 2, in response to the connector module 100 being assembled in the casing 10, the elastic rib 120 is squeezed and abuts against the inner surface of the casing 10, so that a waterproof effect is provided between the connector module 100 and the casing 10. In this way, the liquid can not enter the casing 10 from the junction between the connector module 100 and the casing 10.

It is worth mentioning that the connector module 100 of this embodiment also has a good electromagnetic protection effect. Specifically, as shown in FIG. 4, the first conductive layer 140 is at least coated on a portion of the front side 112 of the casing 10 and the elastic rib 120. The first conductive layer 140 is, for example, a silver paste coating layer, but the type of the first conductive layer 140 is not limited thereto, as long as the first conductive layer 140 is well attached to the elastic rib 120 by, for example, coating.

In this embodiment, the first conductive layer 140 is adapted to contact with the casing 10. Specifically, in response to the connector module 100 being assembled in the casing 10, the elastic rib 120 is squeezed and abuts against the inner surface of the casing 10. Thus, a section of the first conductive layer 140 on the elastic rib 120 also contacts with a section of the casing 10 surrounding the casing opening 12, so that the first conductive layer 140 overlaps with the casing 10 for grounding, so as to provide an electromagnetic protection effect.

In this embodiment, the first conductive layer 140 is not only coated on the elastic rib 120, but also coated on the front side 112 and a portion of a lateral side 116 of the connector shell 110. In an embodiment, the first conductive layer 140 may be coated on the entire outer surface of the connector shell 110. In an embodiment, the first conductive layer 140 may also be coated only on the front side 112 of the connector shell 110.

In addition, the second conductive layer 150 is laid on a side of the first conductive layer 140 opposite to the front side 112. The second conductive layer 150 is, for example, a conductive fabric, but the type of the second conductive layer 150 is not limited thereto. In this embodiment, as shown in FIG. 4, the second conductive layer 150 is not only laid on a side of the first conductive layer 140 opposite to the front side 112, but the second conductive layer 150 further covers a lateral side 116 of the connector shell 110. The second conductive layer 150 optionally covers one or more lateral sides of the connector shell 110.

In addition, in this embodiment, the second conductive layer 150 includes a first portion 151 and a second portion 154 separated from each other. The first portion 151 covers the front side 112 and a portion of the lateral side 116 of the connector shell 110. The second portion 154 covers another portion of the lateral side 116 of the connector shell 110.

Certainly, the configuration and form of the second conductive layer 150 are not limited thereto. In an embodiment, the second conductive layer 150 may be laid on the entire outer surface of the connector shell 110. In an embodiment, the second conductive layer 150 may also be laid only on the front side 112 of the connector shell 110. In an embodiment, the second conductive layer 150 may be a monolithic structure or a structure having more than two members.

In this embodiment, the thickness of the second conductive layer 150 is greater than the thickness of the first conductive layer 140. The thickness of the second conductive layer 150 may be greater than 0.05 millimeter, so as to provide enough thickness to contact with the casing 10. In other words, the front side 112 of the connector shell 110 contacts with the casing 10 through the second conductive layer 150 for grounding, so as to provide a good electromagnetic protection effect. In other embodiments, the second conductive layer 150 may also be a thick conductive silver paste layer, or other conductive structures such as copper foil or aluminum foil, as long as it is well overlapped with the casing 10. In other embodiments, the thickness of the second conductive layer 150 is not limited to be greater than the thickness of the first conductive layer 140. The second conductive layer 150 may also be grounded by contacting the first conductive layer 140 and overlapping the casing 10, which still provides a good electromagnetic protection effect.

In addition, in this embodiment, the second conductive layer 150 includes a second opening 152, and the first opening 114 and the elastic rib 120 are exposed to the second opening 152. A profile of the second opening 152 corresponds to an outer profile of the elastic rib 120, but is not limited thereto, as long as the second opening 152 surrounds the first opening 114.

Referring to FIG. 3 and FIG. 4, in this embodiment, the first conductive layer 140 is coated on the front side 112 of the connector shell 110 and the elastic rib 120, and the second opening 152 of the second conductive layer 150 exposes the elastic rib 120. This means that the projection of the first conductive layer 140 on the front side 112 of the connector shell 110 overlaps with the projection of the second conductive layer 150 on the front side 112 of the connector shell 110. Such a design allows the first conductive layer 140 and the second conductive layer 150 to partially overlap on the front side 112 of the connector shell 110 to provide better electromagnetic protection.

It should be noted that the connector module 100 of this embodiment is coated with the first conductive layer 140 on the elastic rib 120, so the second conductive layer 150 does not need to wrap the elastic rib 120, and a section of the connector module 100 on the elastic rib 120 still has a good electromagnetic protection effect. In addition, since the second conductive layer 150 does not need to wrap the elastic rib 120, the elastic rib 120 is well abutted against the casing 10 to achieve a waterproof effect. After testing, the connector module 100 of this embodiment may successfully pass the IPX5 waterproof test and electromagnetic protection test, and provides good waterproof and electromagnetic protection effects at the same time.

To sum up, the elastic rib of the connector module of disclosure protrudes from the front side of the connector shell, and the elastic rib surrounds the first opening of the connector shell. The first conductive layer is at least coated on the elastic rib, and a section of the first conductive layer on the elastic rib is adapted to contact with a section of the casing surrounding the casing opening. The second conductive layer is laid at least on the front side of the connector shell, and the first opening and the elastic rib of the connector shell are exposed to the second opening of the second conductive layer. Through the above configuration, since the elastic rib abuts against a section of the casing surrounding the casing opening, a waterproof effect is provided between the connector module and the casing. In addition, since a section of the first conductive layer on the elastic rib may contact with a section of the casing surrounding the casing opening, and the second conductive layer is laid at least on the front side of the connector shell, the connector module may provide a good electromagnetic protection effect.

Finally, it should be noted that the above embodiments are only used to illustrate the technical solutions of the disclosure and are not intended to limit it. Although the disclosure has been described in detail with reference to the above embodiments, persons of ordinary skill in the art should understand that they may still modify the technical solutions described in the above embodiments, or replace some or all of the technical features therein with equivalents, and that such modifications or replacements of corresponding technical solutions do not substantially deviate from the scope of the technical solutions of the embodiments of the disclosure.

What is claimed is:

1. A connector module, adapted to be disposed in a casing comprising a casing opening, comprising, a connector shell, comprising a front side and a first opening located on the front side, wherein the first opening is adapted to be aligned with the casing opening;

an elastic rib, disposed and protruding from the front side, wherein the elastic rib surrounds the first opening;

a connection terminal, disposed in the connector shell and exposed to the first opening;

a first conductive layer, coated on the front side and the elastic rib and adapted to contact with the casing; and a second conductive layer, laid on a side of the first conductive layer opposite to the front side and comprising a second opening, wherein the first opening and the elastic rib coated with the first conductive layer are exposed to the second opening.

2. The connector module according to claim 1, wherein a section of the first conductive layer on the elastic rib is adapted to contact with a section of the casing surrounding the casing opening.

3. The connector module according to claim 1, wherein an inner profile of the elastic rib corresponds to a profile of the first opening.

4. The connector module according to claim 1, wherein a profile of the second opening corresponds to an outer profile of the elastic rib.

5. The connector module according to claim 1, wherein the first conductive layer is coated on the front side so that a projection of the first conductive layer on the front side overlaps with a projection of the second conductive layer on the front side.

6. The connector module according to claim 1, wherein a thickness of the second conductive layer is greater than 0.05 millimeter.

7. The connector module according to claim 1, wherein the first conductive layer is a silver paste coating layer and the second conductive layer is a conductive fabric.

8. The connector module according to claim 1, wherein the second conductive layer covers a lateral side of the connector shell.

9. The connector module according to claim 1, wherein the elastic rib is integrated with the connector shell.

10. The connector module according to claim 1, wherein a material of the elastic rib is rubber or silica gel.

* * * * *